US010007272B2

(12) United States Patent
Tirpak et al.

(10) Patent No.: US 10,007,272 B2
(45) Date of Patent: Jun. 26, 2018

(54) MIDAIR TETHERING OF AN UNMANNED AERIAL VEHICLE WITH A DOCKING STATION

(71) Applicant: Echostar Technologies L.L.C., Englewood, CO (US)

(72) Inventors: Christopher Boyd Tirpak, Monument, CO (US); Danny J. Minnick, Castle Rock, CO (US); Keith Gerhards, Parker, CO (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 8 days.

(21) Appl. No.: 15/228,672

(22) Filed: Aug. 4, 2016

(65) Prior Publication Data
US 2018/0039286 A1    Feb. 8, 2018

(51) Int. Cl.
*G05D 1/06* (2006.01)
*B64C 39/02* (2006.01)
(Continued)

(52) U.S. Cl.
CPC ......... *G05D 1/0653* (2013.01); *B64C 39/022* (2013.01); *B64C 39/024* (2013.01);
(Continued)

(58) Field of Classification Search
CPC .... G05D 1/0653; G05D 1/0094; G05D 1/024; B64C 39/022; B64C 39/024;
(Continued)

(56) References Cited

U.S. PATENT DOCUMENTS 7,318,564 B1    1/2008 Marshall
9,056,676 B1    6/2015 Wang
(Continued)

OTHER PUBLICATIONS

Kong et al., Vision-based Autonomous Landing System for Unmanned Aerial Vehicle: A Survey, 2014, IEE, p. 1-8.*
(Continued)

*Primary Examiner* — McDieunel Marc
(74) *Attorney, Agent, or Firm* — Kilpatrick Townsend & Stockton

(57) ABSTRACT

Unmanned aerial vehicle docking systems and methods are presented herein. A UAV can hover in a hovering position above a docking pad of the UAV docking system based on positioning measurements. An on-board camera can image a machine-readable code present on the docking pad. The hovering position of the UAV above the docking pad can be adjusted based on imaging of the machine-readable code and ranging measurements to the docking pad. A tether can be extended from the UAV towards the docking pad. The hovering position of the UAV and extension of the tether can be adjusted such that a mating device present on a distal end of the tether engages with a coupling device of the UAV docking pad. The tether can be reeled in to the UAV to assist in lowering the UAV from the hovering position to a landing position on the docking pad.

20 Claims, 8 Drawing Sheets

(51) Int. Cl.
*B64D 47/08* (2006.01)
*B64F 1/00* (2006.01)
*G05D 1/00* (2006.01)
*G05D 1/04* (2006.01)

(52) U.S. Cl.
CPC ............ *B64D 47/08* (2013.01); *B64F 1/00* (2013.01); *G05D 1/0094* (2013.01); *G05D 1/042* (2013.01); *B64C 2201/024* (2013.01); *B64C 2201/066* (2013.01); *B64C 2201/108* (2013.01); *B64C 2201/141* (2013.01); *B64C 2201/18* (2013.01)

(58) Field of Classification Search
CPC ........ B64C 2201/066; B64C 2201/108; B64C 2201/18; B64F 1/00
See application file for complete search history.

(56) References Cited

U.S. PATENT DOCUMENTS

| | | | | |
|---|---|---|---|---|
| 9,540,121 | B2* | 1/2017 | Byers | B64C 39/024 |
| 9,623,760 | B2* | 4/2017 | Wang | B60L 11/1822 |
| 9,672,707 | B2* | 6/2017 | Kerzner | G08B 13/19682 |
| 9,678,507 | B1* | 6/2017 | Douglas | G08G 5/003 |
| 2012/0292430 | A1 | 11/2012 | Ferrari et al. | |
| 2014/0032034 | A1* | 1/2014 | Raptopoulos | G08G 5/0069 701/25 |
| 2015/0274294 | A1* | 10/2015 | Dahlstrom | B64D 1/18 239/722 |
| 2015/0360797 | A1 | 12/2015 | Melish et al. | |
| 2016/0039542 | A1 | 2/2016 | Wang | |
| 2016/0347462 | A1* | 12/2016 | Clark | B64D 17/62 |
| 2016/0355257 | A1* | 12/2016 | Chappell | B64C 39/024 |
| 2016/0363929 | A1* | 12/2016 | Clark | G05D 1/0011 |
| 2017/0011343 | A1* | 1/2017 | Stenneth | B25J 9/163 |
| 2017/0072812 | A1* | 3/2017 | Von Novak | B60L 11/1868 |
| 2017/0073085 | A1* | 3/2017 | Tremblay | B64F 1/32 |
| 2017/0092109 | A1* | 3/2017 | Trundle | B60L 11/1824 |

OTHER PUBLICATIONS

Cocchioni et al., Unmanned Ground and Aerial Vehicles in Extended Range Indoor and Outdoor Missions, 2014, IEEE, p. 374-382.*

Liu et al., A Survey of Computer Vision Applied in Aerial Robotic Vehicles, 2010, IEEE, p. 277-280.*

Gutierrez et al., Multi-robot Collaborative Platforms for Humanitarian Relief Actions, 2015, IEEE, p. 1-16.*

* cited by examiner

MIDAIR TETHERING OF AN UNMANNED AERIAL VEHICLE WITH A DOCKING STATION

CROSS REFERENCE TO RELATED APPLICATION

U.S. patent application Ser. No. 14/982,366, filed Dec. 29, 2015, entitled "Unmanned Aerial Vehicle Integration with Home Automation Systems," is hereby incorporated by reference for all purposes.

BACKGROUND

For a battery-powered unmanned aerial vehicle (UAV), also referred to as a drone, to be recharged, typically it must be plugged into a recharging device or have a battery pack removed and temporarily coupled with a recharging device. This set up typically requires a user to manually plug a cable or charging device into the UAV or a battery of the UAV. If a UAV is going to be used for periodic (e.g., hourly, daily) tasks around a user's home, requiring the user to manually couple the UAV or the UAV's battery with a recharging device may be inefficient and inconvenient to the user. Rather, a system that can autonomously dock one or more UAVs with a recharging station would allow UAVs an improved ability to operate independently of interaction with a user.

SUMMARY

Various arrangements involving unmanned aerial vehicle (UAV) docking systems are presented. In some embodiments, a system may include a UAV docking station that includes a UAV landing pad; a magnetic coupler; and a recharging system. The system can also include an on-board UAV docking system incorporated as part of a UAV. The on-board UAV docking system can include a camera coupled with the UAV such that the camera images a field-of-view below the UAV. The on-board UAV docking system one or more processors that receive one or more images of the field-of-view below the UAV from the camera and locates the landing pad at least partially based on the one or more received images. The on-board UAV docking system a reel and tether system, comprising a tether line, a reel, and a UAV mating device located at an end of the tether line. The UAV mating device can removably couple with the magnetic coupler of the UAV docking station. The one or more processors can be configured to, as part of a landing procedure, activate the reel to retract the tether line while the UAV mating device is coupled with the magnetic coupler of the UAV docking station to pull the UAV toward the UAV landing pad while the UAV is hovering.

Embodiments of such a system may include one or more of the following features: The tether line, while the magnetic coupler of the UAV docking station is coupled with the UAV mating device, may transfer power from the recharging connector to a battery on-board the UAV. The on-board UAV docking system can include a ranging sensor that determines an altitude of the UAV above the UAV landing pad. The recharging system of the UAV docking station can include a wireless charger that wirelessly transfers power to the UAV when the UAV is docked with the UAV docking station. The UAV landing pad can include multiple visual machine-readable codes that identify different zones of the UAV landing pad, wherein the UAV landing pad accommodates multiple UAVs in the different zones. The magnetic coupler of the UAV docking station can include an electromagnet, wherein the electromagnet is powered down during a takeoff procedure of the UAV after the UAV has begun hovering above the docking pad. The tether line, while the magnetic coupler of the UAV docking station is coupled with the UAV mating device, can transfer data to the one or more processors of the UAV. The UAV can include a global navigation satellite system (GNSS) module which provides location information to the one or more processors of the UAV. The one or more processors can use the location information from the GNSS module to hover the UAV in a general location above the UAV docking station prior to performing the landing procedure. The UAV docking station can include an enclosure system that is controlled by one or more processors of the UAV docking station to open and close as part of the landing procedure and a takeoff procedure. The tether and mating device of the reel and tether system of the on-board UAV docking system may be located approximately directly beneath a center of gravity of the UAV. The UAV docking station can further include a support system that elevates the UAV landing pad at least four feet from the ground.

In some embodiments, a method for using an unmanned aerial vehicle (UAV) docking system is presented. Such a method can include hovering, by the UAV, in a hovering position above a docking pad of the UAV docking system based on global navigation satellite system measurements. The method can include imaging, using an on-board camera of the UAV, a machine-readable code present on a surface of the docking pad of the UAV docking system. The method can include adjusting the hovering position of the UAV above the docking pad based on imaging of the machine-readable code and ranging measurements to the docking pad. The method can include extending a tether from the UAV towards the docking pad. The method can include adjusting the hovering position of the UAV such a mating device present on a distal end of the tether engages with a coupling device of the UAV docking pad. The method can include reeling the tether in to the UAV to assist in lowering the UAV from the hovering position to a landing position on the docking pad.

Embodiments of such a system may include one or more of the following features: The method may include charging one or more batteries of the UAV via the tether and mating device engaged with the coupling device of the UAV docking pad. Engaging the mating device with the coupling device of the UAV docking pad may be performed using magnetic attraction. The method may include opening, by the UAV docking system, one or more enclosure doors to permit access to expose the docking pad and permit the mating device to engage with the coupling device of the UAV docking pad. The method may include closing, by the UAV docking system, the one or more enclosure doors after the UAV has been determined to have touched down on the docking pad of the UAV docking system. The method may include determining, by the UAV docking system, that the UAV has touched down onto the docking pad. The method may include ceasing to power a propulsion system of the UAV in response to determining that the UAV has touched down onto the docking pad

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
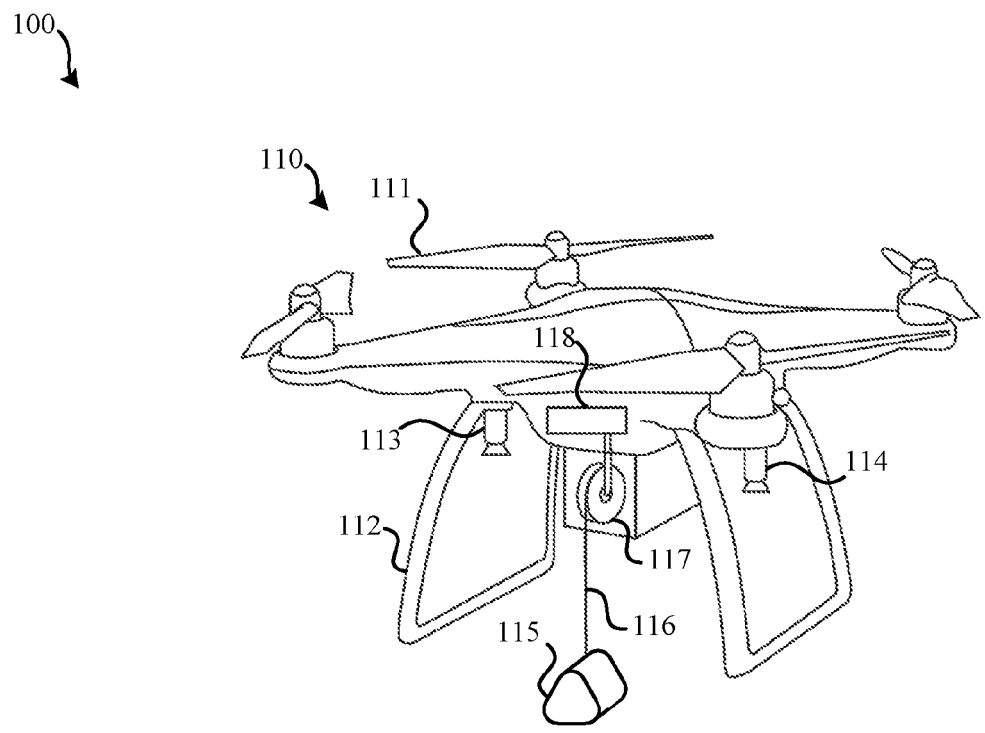
FIG. 1 illustrates an embodiment of a UAV docking system that includes a UAV and docking station.
Figure 1:
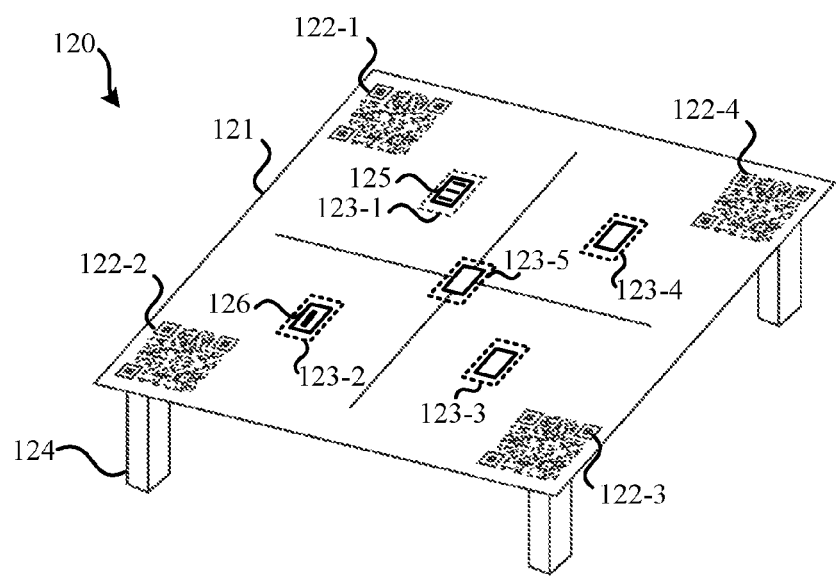

A UAV docking system may include components present on a UAV and on a UAV docking station. A UAV docking station may include multiple pads or zones on a single larger pad for UAVs to land. Each docking pad may visually display a machine-readable code, such as a QR code or bar code, that distinguishes each pad from the other and, possibly, may include orientation information permitting a UAV to properly land and connect with the UAV docking station. When instructed to land, the UAV may use multiple levels of sensors to position itself above the docking pad. First, a global navigation satellite system (e.g., GPS, GLONASS) may be used to position the UAV in the general vicinity of the UAV docking system (e.g., within 10-20 feet). Next, a camera mounted on the UAV may be used to locate the UAV docking station and locate the machine-readable code. Based on the position of this code, the UAV may hover directly above the pad, such as at an approximate altitude of 5 feet above the docking pad. Next, in some embodiments, a ranging sensor, such as an ultrasound sensor or other form of time-of-flight sensor, may be used to determine a precise distance between the UAV and the docking pad. An on-board wireless receiver may receive weather and/or wind information from the UAV docking station. The UAV may decrease its altitude until it is closer to the docking pad, such as 1 foot above the docking pad. At a particular distance above the pad, the UAV may spool out a mating device on a tether. This mating device may be metallic or magnetic such that it will couple in a particular orientation with a magnetic coupler of the UAV docking station.

The mating device attached with the tether may be extended from the hovering UAV until it reaches a surface of the docking pad and couples with a magnetic coupler of the UAV docking station. The mating device may be determined to have reached the surface of the docking pad based on the mating device being sensed to have coupled with a magnetic coupler of the UAV docking station, the length of the tether that the UAV has spooled out in combination with a determined distance above the landing pad, and/or imaging by the UAV's camera system. As necessary, the UAV may adjust its hovering in relation to the machine-readable code or the docking station such that the mating device engages with the magnetic coupler of the UAV docking station. For instance, the UAV may adjust its hovering such that the mating device contacts the magnetic coupler which is known to be located at a certain offset from the machine-readable code. Via the tether, communication between the UAV and the docking station may be performed, such as similar to Ethernet.

The mating device and the magnetic coupler may engage with each other while the UAV is hovering. The magnetic properties of the magnetic coupler of the UAV docking station may cause the mating device of the UAV to engage with the magnetic coupler in a particular orientation. Once coupled, the UAV may control its descent by reeling in the tether until the UAV touches down on the landing pad. That is, the UAV may continue turning its rotors such that the UAV hovers and decreases in altitude slowly by the opposing force of the tether being reeled in while the mating device is engaged with the magnetic coupler of the UAV docking station. By the mating device being engaged with the magnetic coupler prior to landing, the UAV may be landed precisely on the UAV docking pad because the tether, as it is retracted, will cause the UAV to position itself in relation to the magnetic coupler. Once the UAV has touched down on the docking pad, possibly as determined using the ranging sensor or based on a position of the reel, the rotors of the UAV are stopped. The UAV may have one or more on-board batteries charged through the tether connection established while the UAV was still in the air. Alternatively, the UAV docking pad may have a wireless charging device incorporated into it. Such a pad may be used to charge one or more batteries of the UAV. In any of such embodiments, data may be wirelessly transmitted or may be transmitted via a wire incorporated as part of the tether.

In some embodiments, present on the UAV docking station may be an enclosure system, which can include weather doors that open to allow entry of the UAV and close once the UAV has landed. Weather doors may butterfly open such that the doors provide protection from the wind during the UAV's final descent (and initial takeoff) from the docking pad of the UAV docking station. When taking off, the magnetic coupler of the UAV docking station and the mating device of the UAV may be disengaged while the UAV is on the landing pad or after the UAV has taken off. The tether may be fully retracted by the UAV, and the UAV may take to flight with its batteries fully charged. In some embodiments, a battery pack of the UAV may be physically swapped for another battery pack.

FIG. 1 illustrates an embodiment of a UAV docking system 100 that includes a UAV and docking station. UAV docking system 100 may include UAV 110 and UAV docking station 120. UAV 110 may include rotors 111 that provide for lift and can be controlled to adjust the UAV's flight path. UAV 110 may include landing gear 112 which may include rails or wheels that allow UAV 110 to land on approximately flat surfaces. In some embodiments, conductive landing gear 112 may be used such that each support is associated with a positive or negative terminal. Charging of an on-board battery of UAV 110 may be accomplished via electrical connectors of the docking station 120 that match with such landing gear that serves as dual purpose of electrical contacts and to support UAV 110. UAV 110 may include an on-board UAV docking system that includes: camera 113, ranging sensor 114, mating device 115, tether 116, reel 117 (which can also be pulley-based mechanism), and motor 118.

Camera 113 may be attached with UAV 110 such that the camera's field-of-view is below UAV 110, allowing objects directly below UAV 110 to be imaged by camera 113 when UAV 110 is hovering. Camera 113 is communicatively coupled with one or more processors and memory that allow images captured by camera 113 to be analyzed and used to direct hovering and flight of UAV 110. Camera 113 may be a visible light camera and/or an infrared camera.

Ranging sensor 114 may be attached with UAV 110 such that ranging sensor 114 can determine an altitude of UAV 110 above the ground or any objects roughly directly below UAV 110. When in flight, ranging sensor 114 may be used for determining the altitude above ground. When about to land, ranging sensor 114 may be used for determining a distance above docking pad 121 (also referred to as a landing pad). Ranging sensor 114 is communicatively coupled with one or more processors of UAV 110 that allow the measurements made by ranging sensor 114 to be analyzed and used to control hovering and flight of UAV 110. Ranging sensor 114 may be sonar-based or some other time-of-flight ranging sensor.

Mating device 115 may be configured to removably couple with magnetic couplers 123 of UAV docking station 120. Mating device 115 may be metallic or magnetic. In some embodiments, mating device 115 functions as an electromagnet such that one or more processors on-board UAV 110 control when mating device 115 exhibits magnetic properties. For instance, mating device 115 may only be magnetized when UAV 110 is attempting to connect mating device 115 with a magnetic coupler of magnetic couplers 123 (which, as illustrated in FIG. 1, includes magnetic couplers 123-1, 123-2, 123-3, 123-4, and 123-5). In some embodiments, a center magnetic coupler 123-5 may be used to accommodate larger UAVs that do not fit onto one of the quadrants of docking station 120 associated with magnetic couplers 123-1 through 123-4. UAV 110 may align and orient itself for magnetic coupler 123-5 using one or more of landing pad identifiers 122. Alternatively or additionally, a separate landing pad identifier may be present for magnetic coupler 123-5.

Mating device 115 may include a power and/or a data connector. Mating device 115, when coupled with a magnetic coupler, such as magnetic coupler 123-1, may receive power via one or more electrical contacts and may transfer power to recharge an on-board battery of UAV 110. Mating device 115 may also have one or more electrical contacts that are used for data transfer. Rather than wirelessly transmitted data, data may be transmitted between UAV docking station 120 and UAV 110 via mating device 115. In some embodiments, mating device 115 includes neither a power or data connector—rather, mating device 115 may be used exclusively for aiding with landing and/or takeoff of the UAV. In still other embodiments, mating device 115 may not be present.

Tether 116 can be a line, one or more cables, one or more wires, and/or a harness of wires that may be extended or retracted by UAV 110. Mating device 115 may be attached to an end of tether 116. Tether 116 may be capable of transferring power and/or data from mating device 115 to the one or more processors of UAV 110. The length of tether 116 is varied by embodiment; in some embodiments, the tether is a relatively short 6-12 inches, but in other embodiments the tether is greater than a foot in length. In one embodiment, the tether is 24 inches in length. Tether 116 and reel 117 may be attached with UAV 110 such that the portion of tether 116 that is spooled out is directly or approximately directly below a center of gravity of UAV 110. Therefore, when tension is applied to tether 116, UAV 110 remains balanced around its center-of-gravity.

Tether 116 may be extended from and retracted onto reel 117. Reel 117 may be sized to accommodate the length of tether 116. Reel 117 may allow tether 116 to be retracted such that, while UAV 110 is in flight, mating device 115 does not swing substantially enough to affect the flight characteristics of UAV 110. Reel 117 can be spooled out or in by motor 118. Motor 118 is in communication with the one or more processors on-board UAV 110. Therefore, based on commands from the one or more processors, mating device 115 is raised or lowered by motor 118 causing reel 117 to spool tether 116 in or out, respectively.

UAV docking station 120 may include: docking pad 121, landing pad identifiers 122 (which include landing pad identifiers 122-1, 122-2, 122-3, and 122-4), magnetic couplers 123, and supports (such as support 124). Docking pad 121 may be sized to accommodate one or more than one UAVs. The illustrated embodiment of docking pad 121 is sized to accommodate four UAVs at a given time. (Of note, UAV 110 is enlarged to show detail in relation to UAV docking station 120.) Four of the same or different types/models of UAVs may each use docking pad 121. For instance, some UAVs may have different requirements that require a dedicated portion of docking pad 121. For instance, a particular type of UAV may use a different type of wired connector than UAV 110. In some embodiments, despite different regions of docking pad 121 being configured for different types of UAVs to land in such regions, it may only be possible to have one UAV land on docking pad 121 at any given time, such as due to size constraints of docking pad 121. In some embodiments, landing pad identifiers 122-1 through 122-4 can serve as directional indicators for use by the UAV in orienting itself in relation to docking pad 121.

Landing pad identifiers 122 represent machine-readable codes that can be imaged from above docking pad 121 by a hovering UAV, such as UAV 110. Landing pad identifiers 122 may be in the form of barcodes or QR codes, which is illustrated in FIG. 1. Each zone or region on docking pad 121 may have its own landing pad identifier. UAV 110 may locate an appropriate region of docking pad 121 to land on based on the associated landing pad identifier. Based on the location of the landing pad identifier of landing pad identifiers 122, UAV 110 can determine, such as based on an X and Y offset, where mating device 115 should be lowered in order to couple with a magnetic coupler of magnetic couplers 123. In some embodiments, a single landing pad identifier may be present for the entire docking pad 121. If such an embodiment of the docking pad has multiple regions or zones for multiple UAVs to land on, the location of such regions or zones may be determined based on offsets in the plane of the docking platform from the docking pad identifier.

Magnetic couplers 123 may be configured to removably couple with mating devices such as mating device 115. Magnetic couplers 123 may be permanently magnetized, such as using a permanent magnet. In other embodiments, magnetic couplers 123 may use an electromagnet such that magnetic couplers 123 can have their magnetic forces engaged or disengaged as needed. For instance, an electromagnetic coupler may only be engaged when it is desired for the electromagnetic coupler to attract mating device 115. A magnetic coupler, such as magnetic coupler 123-1 may magnetically repulse mating device 115 if mating device 115 is not in the proper orientation for connection with magnetic coupler 123-1 (e.g., causing mating device 115 to spin 180 degrees). Magnetic couplers 123 are illustrated using a dotted line because in some embodiments, magnetic couplers 123 are located below a surface of docking pad 121. In other embodiments, at least a portion of magnetic couplers 123 may be located on top of docking pad 121.

Electrical contacts 125 may serve to electrically connect with electrical contacts present on mating device 115 when mating device 115 has been properly coupled with magnetic coupler 123-1. Due to the magnetic attraction between magnetic coupler 123-1 and mating device 115, mating device 115 may snap into place atop electrical contacts 125, forming one or more electrical connections between circuits present in UAV docking station 120 and UAV 110 via tether 116, mating device 115, and electrical contacts 125. Electrical contacts 125 may include contacts for transferring power to the UAV and/or for exchanging data. In some embodiments, electrical contacts 125 are not present; rather mating device 115 may be used solely for aligning the UAV during a landing and/or takeoff procedure. Electrical contacts 125 and/or corresponding electrical contacts present on mating device 115 may slightly protrude and be spring-loaded such that when mating device 115 is magnetically coupled with magnetic coupler 123-1, a reliable electrical connection is formed between electrical contacts 125 and the electrical contacts of mating device 115. In some embodiments, inductive charging may be used to recharge the battery of the UAV. As such, electrical contacts 125 may not be needed for charging purposes.

As can be seen in relation to electrical contacts 126, electrical contacts 126 differ from electrical contacts 125. Electrical contacts 126 may be configured to couple with a mating device of a different style or type, such as for a different style or type of UAV. For some magnetic couplers, such as magnetic coupler 123-3 and magnetic coupler 123-4, no electrical contacts may be present. For such embodiments, neither power nor data may be transferred via a wired connection to a docked UAV.

Support 124 may serve to elevate docking pad 121 a distance above a floor or the ground. Support 124, of which there may be four (similar to a typical table), may be of different lengths if docking pad 121 is to be elevated above uneven ground. Support 124 and docking pad 121 may be made of a rigid material such as plastic, metal, or wood.

Figure 2A:
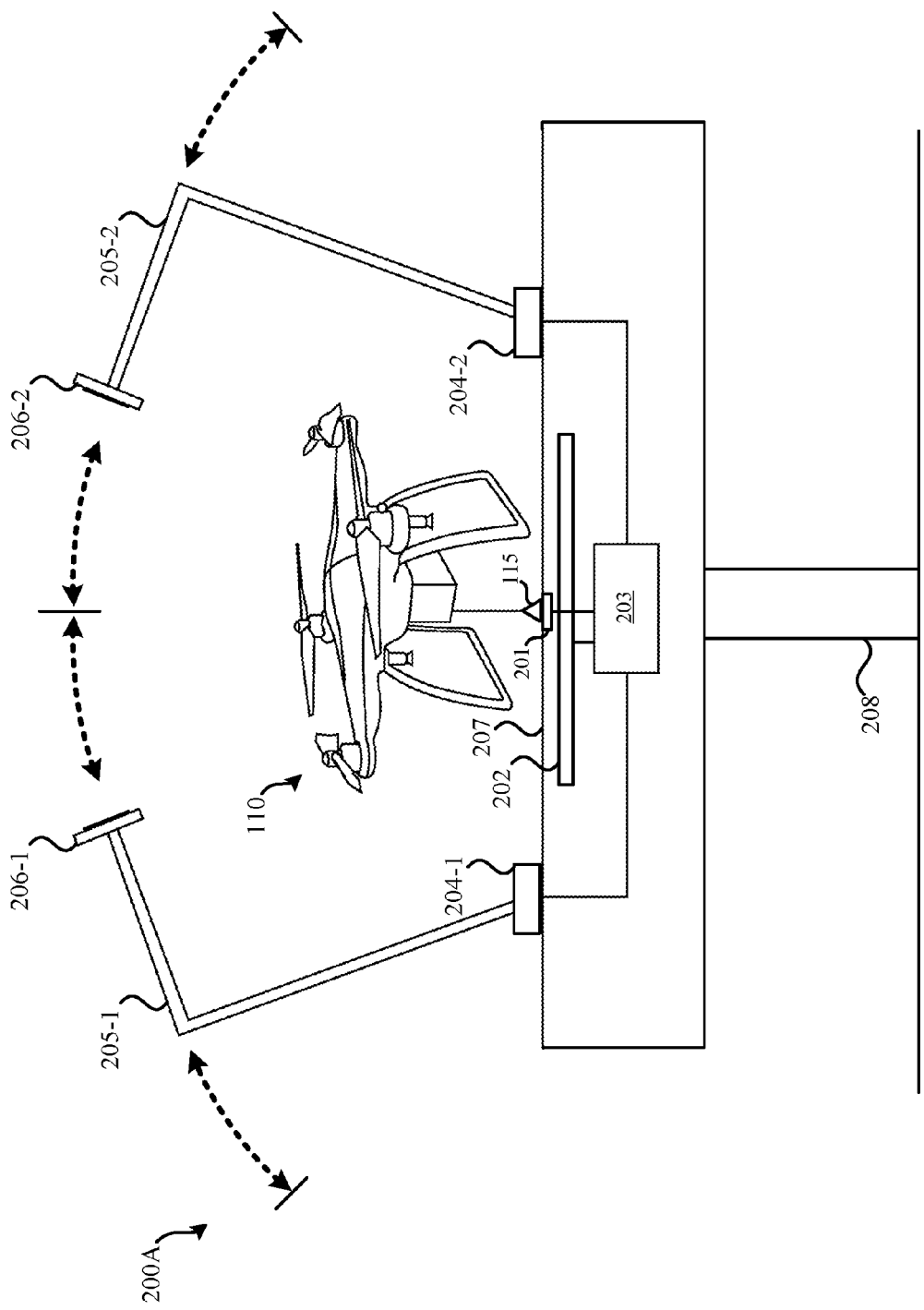
FIG. 2A illustrates another embodiment of a UAV docking system that includes a UAV and docking station.

FIG. 2A illustrates another embodiment of a UAV docking system 200A that includes a UAV and docking station. UAV docking system 200A may incorporate a docking pad similar to the embodiment of FIG. 1. In FIG. 2A, the illustrated docking pad 207 is sized to accommodate a single UAV at a given time.

UAV docking system 200A includes a reel and tether system of UAV 110 as detailed in relation to FIG. 1. Mating device 115 and magnetic coupler 201 may function as detailed in relation to FIG. 1. UAV docking system 200A may also include an enclosure system that serves to protect a UAV that is landed on docking pad 207 and protects docking pad 207 when the UAV is elsewhere. When open, such as to a 45 degree angle as indicated in FIG. 2, the enclosure system may at least partially shield docking pad 207 from the wind to decrease the likelihood of a landing UAV missing the intended location on the landing pad. In other embodiments, the enclosure system may open to between 25 and 75 degrees.

Such an enclosure system may include weather doors 205, door seals 206, door actuators 204, door actuators 204, and processing and communication system 203. Weather doors 205, which include weather door 205-1 and weather door 205-2, may be configured to butterfly open, such as on hinges, away from each other. Weather doors 205 may each include a generally vertical portion (which forms a sidewall when weather doors 205 are closed) and a horizontal top portion. When closed, weather doors 205 form a cavity that can house UAV 110. Dotted arrows are presented in FIG. 2 to illustrate the opening and closing butterfly motion of weather doors 205. Weather doors 205 may only open to a certain angle, such as 45°. By only opening to such an angle, weather doors 205 may provide shelter from wind for docking pad 207, such that when UAV 110 is hovering a short distance above docking pad 207, weather doors 205, even when open, may provide at least some shelter from wind. Door actuators 204, which may each include a motor, may serve to cause weather doors 205 to open and shut based on a command received from processing and communication system 203. Door seals 206 may serve to form a seal between weather door 205-1 and weather door 205-2 when these doors are closed.

Figure 2B:
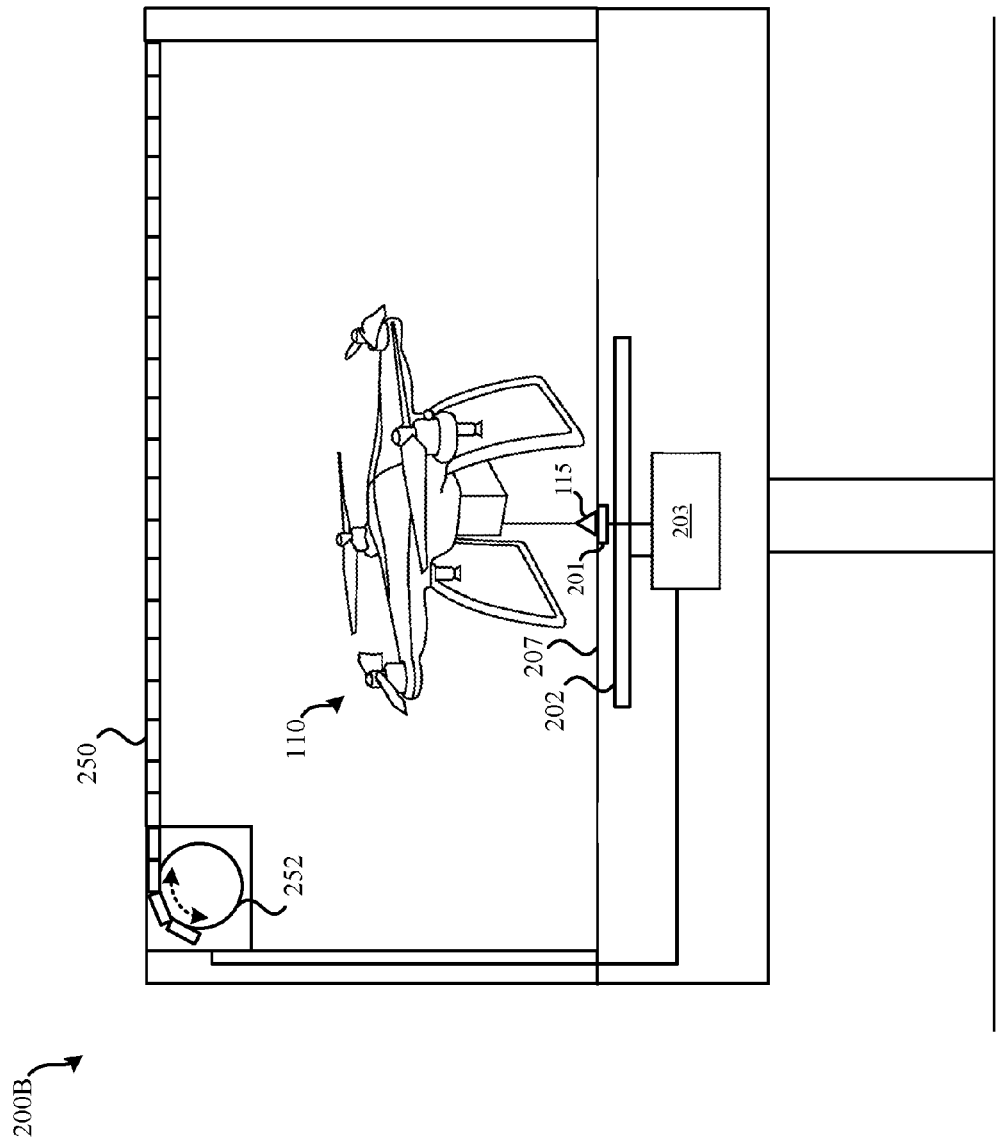
FIG. 2B illustrates another embodiment of a UAV docking system that includes a UAV and docking station.

FIG. 2B illustrates another embodiment of a UAV docking system 200B that includes a UAV and docking station. UAV docking system 200B may incorporate a docking pad similar to the embodiment of FIG. 1. In FIG. 2B, the illustrated docking pad 207 is sized to accommodate a single UAV at a given time. In FIG. 2B, a sliding door 250 may be retracted onto roller 252. By roller 252 being actuated, sliding door 250, which may be composed of a flexible material or segments of a rigid material (as illustrated), may be extended and retracted.

Processing and communication system 203 may include one or more processors and one or more communication interfaces. The one or more processors may control door actuators 204 and via the one or more communication interfaces, may receive information and communicate with UAV 110. A first communication interface may be present in processing in communication system 203 to communicate with UAV 110. The first communication interface may be wired and communicate with UAV 110 via mating device 115 when coupled with magnetic coupler 201 or the first communication interface may be wireless, such as WiFi® Bluetooth® or communication that corresponds to the IEEE 802.15.4 standard. A second communication interface (or the same communication interface) may be used for communicating with a remote computer system, such as via a wireless network.

UAV docking system 200 may also include wireless charger 202. Wireless charger 202 may not need to have a wired connection with UAV 110 in order to charge one or more batteries of UAV 110. That is, wireless charger 202, using electric or magnetic fields to perform inductive charging, may be able to transfer electrical power to UAV 110 when UAV 110 is resting on docking pad 207 or, possibly, is hovering in close proximity to docking pad 207. In such embodiments where a wireless charger is used, mating device 115 may be used only for transmitting data and/or for guiding UAV 110 when landing and/or taking off. In other embodiments of UAV docking system 200, rather than wireless charger 202 being present, power may be provided to UAV 110 via mating device 115.

UAV docking system 200 may use a single support 208, such as a pole, to elevate docking pad 207 and other components of UAV docking system 200 distance above a floor or ground. In other embodiments, multiple supports are used. UAV docking system 200 may be especially suited to being installed outdoors due to weather doors 205. Support 208 may serve to elevate components of UAV docking system 200 away from predators and vermin. In some embodiments, single support 208 elevates the landing platform of UAV docking system 200 between 2 and 8 feet off the ground, such as four feet off the ground. In some embodiments, a UAV docking station is powered by a solar panel or other power source separate from an electrical grid, thus allowing it to function independently of a "wired" power source. A solar panel or another off-grid power source may charge one or more batteries of the UAV docking station, which may, in turn, be used to charge the one or more batteries of the UAV and power the UAV docking station.

Figure 3:
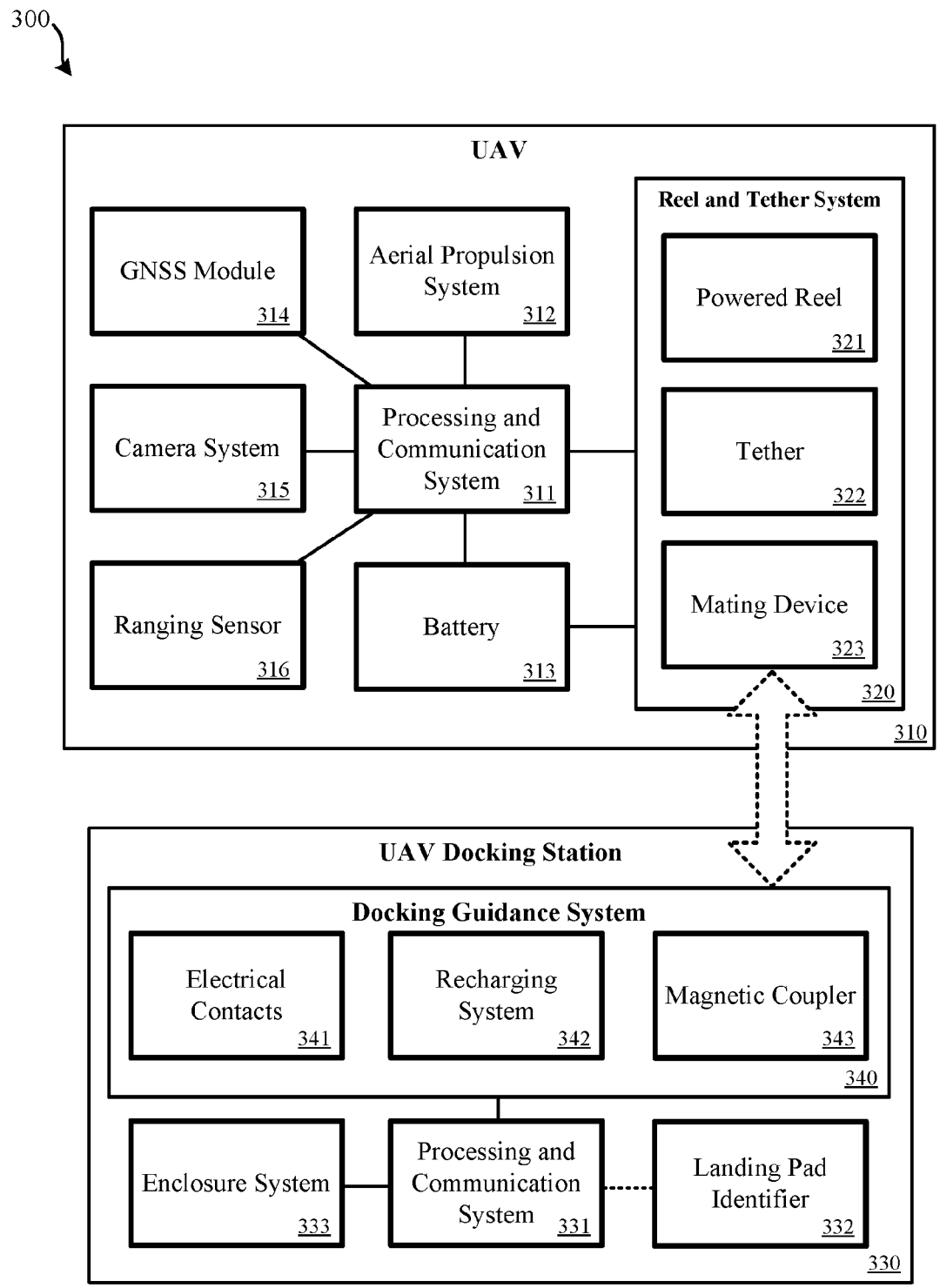
FIG. 3 illustrates an embodiment of a block diagram of a UAV docking system that includes a UAV and docking station.

FIG. 3 illustrates an embodiment of a block diagram of a UAV docking system 300 that includes a UAV 310 and a UAV docking station 330. UAV docking system 300 can represent the UAV docking systems of FIGS. 1 and 2. UAV 310 may include processing and communication system 311, aerial propulsion system 312, battery 213, GNSS module 314, camera system 315, ranging sensor 316, and reel and tether system 320. Processing and communication system 311 may include one or more processors and one or more communication interfaces. The one or more communication interfaces may be configured to communicate via a wired connection via reel and tether system 320 and/or via a wireless communication link with a remote computerized device, such as processing and communication system 331. For example, a wireless communication link may receive weather and/or wind information from UAV docking station 330 or from another source.

Aerial propulsion system 312 may be one or more rotors that are used to provide lift for UAV 310 and control the flight path of UAV 310. One or more batteries, such as battery 213, are present on UAV 310. Battery 313 may serve as the primary source of power for other components of UAV 310. For instance, battery 313 may provide the power for aerial propulsion system 312 to lift UAV 110 into the air. A GNSS module, which may be a GPS module, may be used for navigation following a take-off procedure being performed and prior to a landing procedure being performed. Camera system 315 and ranging sensor 316 may function as detailed in relation to FIG. 1.

Reel and tether system 320 may include: powered reel 321, tether 322, and mating device 323. These components may function as detailed in relation to FIG. 1. Powered reel 321 may include a motor that can spool out and spool in the tether via the reel.

UAV docking station 330 may include processing and communication system 331, landing pad identifier 332, enclosure system 333, and docking guidance system 340. As previously detailed, processing and communication system 331 may include one or more processors and one or more communication interfaces, which may be wired or wireless. Landing pad identifier 332 may represent a machine-readable code which is visible from above a docking pad of UAV docking station 330. In some embodiments, landing pad identifier 332 is communicatively coupled with processor and communication system 331 such that processing and communication system 331 can change or adjust landing pad identifier 332. In such embodiments, landing pad identifier 332 may be presented on an electronic display, such as an LCD display. In other embodiments, landing pad identifier 332 may be a fixed graphic on a surface of the docking pad of UAV docking station 330. Enclosure system 333 may function as detailed in relation to the weather doors and motors of FIG. 2. In some embodiments, in addition or in alternate to the use of landing pad identifier 332, UAV docking station 330 may beacon an identifier of UAV docking station 330. For instance, using Bluetooth® communication, a beaconing message may be analyzed by UAV 110 to confirm it has arrived at the correct UAV docking station.

Docking guidance system 340 may include: electrical contacts 341, recharging system 342, and magnetic coupler 343. Magnetic coupler 343 may couple with mating device 323 in a specific orientation. Magnetic forces exerted by magnetic coupler 343 on mating device 323 (or by mating device 323 or magnetic coupler 343) may cause mating device 323 to "snap" to a particular position and orientation relative to magnetic coupler 343 when mating device is moved close enough to magnetic coupler 343. Recharging system 342 may be wired and may provide power to battery 313 via electrical contacts 241 and mating device 323. Electrical contacts 341 may serve to provide electrical connections for data transfer between processing and communication system 331 and processing and communication system 311. Further, electrical contacts 341 may serve to provide electrical connections for power transfer between UAV docking station 330 and battery 313.

In some embodiments, UAV docking station 330 has an on-board weather station that can gather weather and/or wind information. For example, an anemometer may be used to determine wind speed and direction. Such information may be transmitted to UAV 310 for use in coordinating landing and/or takeoff. In some instances, if weather is too adverse or the wind is too strong, landing may be aborted. In other instances, the UAV may compensate for the wind and/or weather, such as by descending upwind from the UAV docking station to compensate for its reel being blown down wind.

Figure 4A:
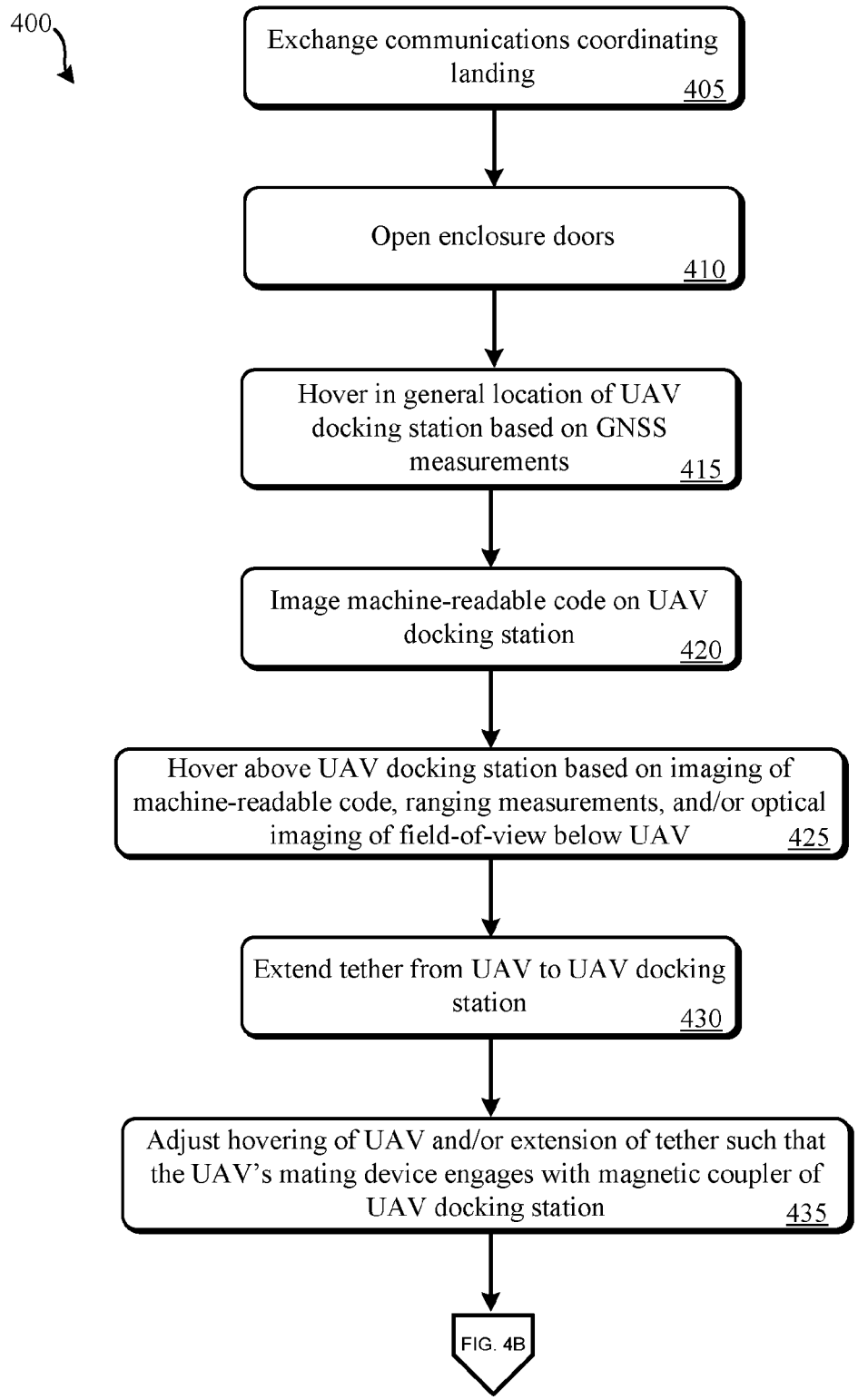
FIGS. 4A and 4B illustrate an embodiment of a method for landing a UAV on the docking station using the UAV docking system.
Figure 4B:
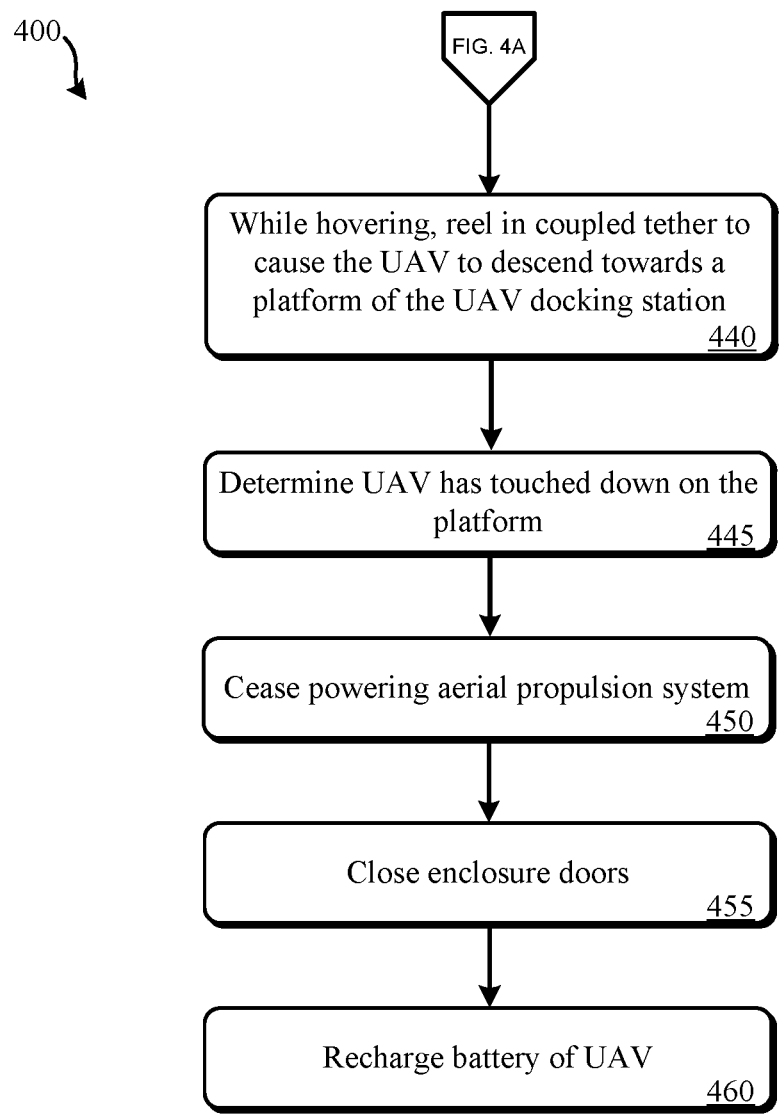

Using the systems detailed in relation to FIGS. 1-3, various methods may be performed. FIGS. 4A and 4B illustrate an embodiment of a method 400 for landing a UAV on the docking station using the UAV docking system. Method 400 may be performed using the UAV docking systems detailed in relation to FIGS. 1-3 or another similar docking system. Generally, method 400 may be understood to be a landing procedure for landing a UAV on a UAV docking station.

Beginning on FIG. 4A, at block 405, communications may be exchanged between the UAV docking station and the UAV. This communication may instruct the UAV to a particular landing pad or landing zone of the UAV docking station. The UAV may be informed of capabilities of different available landing zones of the UAV docking station (e.g., a particular landing zone may be able to recharge the one or more batteries of the UAV faster and/or may use a different style connector). The UAV docking station may also provide one or more measurements to the UAV that could be useful for landing, such as a wind speed and wind direction. In some embodiments, rather than such communications being performed directly between the UAV docking station and the UAV, a remote computerized system that is in communication with both the UAV and the UAV docking station may coordinate the landing. For instance, a home automation host system, such as detailed in U.S. patent application Ser. No. 14/982,366, filed Dec. 29, 201, entitled "Unmanned Aerial Vehicle Integration with Home Automation Systems," may be used. This application is hereby incorporated by reference for all purposes.

At block 410, the UAV docking station may open its enclosure system to allow the UAV access to the one or more docking pads or zones of the UAV docking station. The enclosure system may open in response to the communications of block 405 that indicate that the UAV is within a predefined distance of the UAV docking station. In some embodiments, the enclosure system may only be partially opened if wind is present to help shield a landing UAV from being blown off course by the wind. If no wind or very little wind is present, the enclosure system may open fully; that is, the angle to which the enclosure system opens may be based on measured or forecast wind. Such forecast wind may be obtained from an Internet-based source for a location of the UAV docking station.

Based on GNSS measurements, the UAV may hover in the general location of the UAV docking system. That is, the UAV may attempt, based on GNSS measurements, to hover approximately 5 or 10 feet above the UAV docking station. Due to imprecision in GNSS measurements, it can be expected that the UAV will likely be at least several feet off laterally from hovering directly above the UAV docking station.

At block 420, using a camera onboard the UAV that has a field-of-view below the UAV, the UAV may capture an image of a machine-readable code present on the UAV docking station. This machine-readable code may identify a location of the UAV docking station to the UAV and may also help the UAV identify a particular landing zone or landing pad of the UAV docking station on which to land. For instance, in some embodiments, separate machine-readable codes may be present on each UAV docking pad or docking zone of the UAV docking station, such as illustrated in FIG. 1. In other embodiments, a single machine-readable code may be present for the UAV to identify the entire docking pad of the UAV docking station. In some embodiments, images captured using the camera of the UAV may be analyzed to identify a shape of the UAV docking station itself, which may eliminate the need for a machine-readable code. Or, alternatively, the shape of the UAV docking station may be used to locate the docking station itself, but the machine-readable code may be used to identify a particular landing zone or landing pad of the UAV docking station.

At block 425, the UAV may hover above the UAV docking system by adjusting its position from where it was hovering based on GNSS measurements at block 415. The adjustment of the UAV's position in relation to the UAV docking station at block 425 may be based on the imaging of the machine-readable code at block 420 and/or additional measurements made using images captured by the camera of the UAV. In some embodiments, a ranging sensor may be present on the UAV. When approximately above the UAV docking station, the ranging sensor may be used to determine an altitude above the UAV docking system. The UAV, in response to the measurements made by the ranging sensor, may adjust its altitude such that it hovers at an altitude at which the tether is to be extended from the UAV to the UAV docking station.

At block 430, the tether, and the mating device attached with the tether, may be lowered from the UAV to the docking platform of the UAV docking station or just above the docking platform. At block 435, hovering of the UAV and/or the length of the portion of the tether that has been extended from the reel may be adjusted. The UAV may adjust its altitude and/or lateral hovering position as necessary such that the mating device of the UAV engages with the magnetic coupler of the UAV docking station based on imaging and/or ranging measurements. If the magnetic coupler of the UAV docking station relies on electromagnetics, the electromagnet of the magnetic coupler may be powered by the UAV docking station such that the magnetic coupler is magnetized (and/or the electromagnet of the mating device of the UAV may be powered such that the mating device is magnetized). Once the mating device of the UAV is within a certain distance of the magnetic coupler, magnetic forces present between the magnetic coupler of the UAV docking station and the mating device may cause the mating device to snap into a magnetically-coupled state with the magnetic coupler in a particular orientation. When magnetically coupled, one or more electrical contacts of the mating device may be in electrical contact with one or more electrical contacts of the UAV docking station. In some embodiments, the mating device having been magnetically coupled with the magnetic coupler of the UAV docking station may be sensed based on the electrical connection through such electrical contacts being present. This connection may be sensed by the UAV docking station and/or the UAV. It should be understood that sensing of the connection between the mating device and the magnetic coupler may also be performed in various other ways.

Continuing to FIG. 4B, with the mating device of the UAV magnetically coupled with the magnetic coupler of the UAV docking station, the reel of the UAV with which the tether is coupled may be retracted or reeled in while the UAV is hovering at block 440. The amount of force exerted downward by the tether being reeled in by the UAV may be sufficient to overcome the lift of the aerial propulsion system (e.g., rotors) such that the UAV descends while the tether is being reeled in. The force exerted by the magnetic coupler on the tether may be directly below the center of gravity of the UAV, thus preventing any torsion from causing the UAV to tilt. The tether may continue to be reeled in until the UAV touches down on the landing pad. At block 445, it may be determined that the UAV has touched down on the landing platform of the UAV docking station. Touchdown may be determined based on: analyzed images from the camera of the UAV, ranging measurements from the ranging sensor the UAV, pressure sensor measurements present on either landing gear of the UAV and/or the docking pad of the UAV docking station, and/or the tether having been reeled in to a defined length.

At block 450, the aerial propulsion system of the UAV may be powered down to conserve power and to eliminate lift from being created by the UAV. At block 455, if an enclosure system is present on the UAV docking station, the enclosure system may be closed to protect the UAV while it is present on the landing pad of the UAV docking station. At block 460, one or more batteries of the UAV may be recharged. Such charging may occur via a wired connection between the UAV and the UAV docking station established via the tether, electrical contacts, and mating device. In some embodiments, a wireless charging system may be used instead. Further, data may be transmitted between the UAV in the UAV docking station via the tether or via a wireless communication channel. In other embodiments, both the UAV in the UAV docking station may communicate with a remote computerized system, such as via a wireless network connection, rather than communicating directly with each other.

Figure 5:
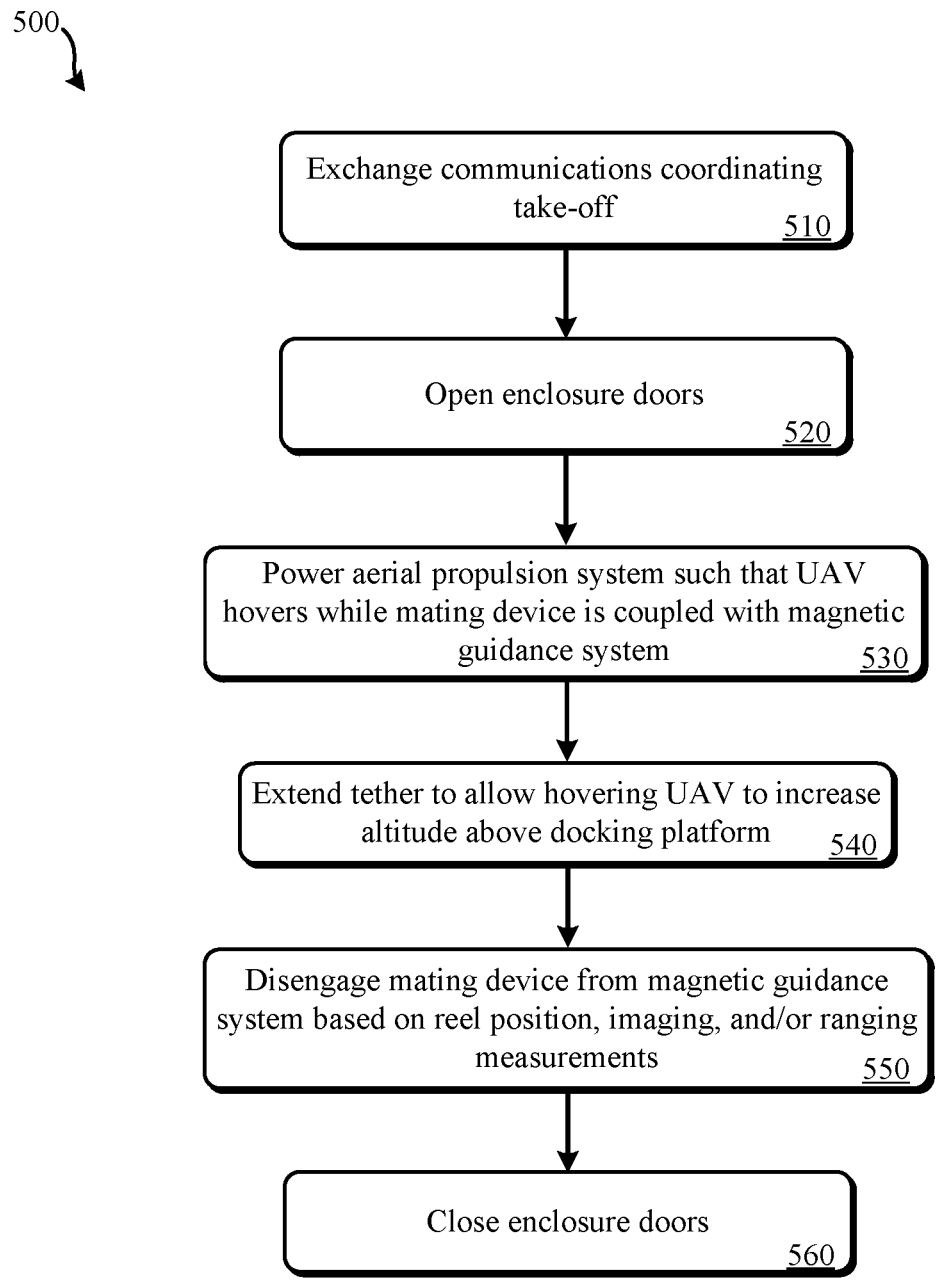
FIG. 5 illustrates an embodiment of a method for a UAV taking off from a docking station using the UAV docking system.

FIG. 5 illustrates an embodiment of a method for launching a UAV from a docking station using the UAV docking system. Generally, method 500 may be understood to be a take-off procedure for launching a UAV from a UAV docking station. Method 500 may be performed using the UAV docking systems detailed in relation to FIGS. 1-3 or another similar docking system. Further, while method 400 shows how the UAV may be landed on a UAV docking station, method 500 may then be used for the UAV to take off from the UAV docking station.

At block 510, communications may be exchanged between the UAV in the UAV docking station about takeoff.

Depending on the embodiment, such communications may be exchanged: via a wired communication link established via the tether and the mating device, via wireless communication link directly between the UAV docking station in the UAV, or via a remote computerized device that communicates with the UAV in the UAV docking station via a wireless network connection or direct wireless communication link. In anticipation of the takeoff, at block 520, the UAV docking station may open its enclosure doors, if present. The distance to which the enclosure doors are open may vary based on an amount of wind being present.

At block 530, the aerial propulsion system of the UAV may be powered sufficiently such that the UAV begins to hover while the mating device is still coupled with the magnetic coupler of the UAV docking station. The amount of tether that is reeled out by the reel and tether system of the UAV may only permit the UAV to hover a short distance above the landing pad. In some embodiments, at this point, the landing gear of the UAV may still be in contact with the docking pad. At block 540, the reel may be commanded to reel out a length of the tether to allow the hovering UAV to increase its altitude above the docking platform. Therefore, at block 540, the mating device of the reel and tether system is still magnetically coupled with the magnetic coupler of the UAV docking station.

At block 550, in response to the tether being reeled out to a certain distance, GNSS measurements, ranging sensor measurements, and/or analysis of one or more images captured by the camera of the UAV, the mating device may be decoupled from the magnetic coupler of the UAV docking station. This decoupling may be performed by the magnetic coupler of the UAV docking station having its electromagnet powered down, thus decreasing or eliminating the magnetic force between the mating device and the magnetic coupler. Once the processing system of the UAV receives a signal indicative that the connection between the magnetic coupler in the mating device is no longer present, the tether and the mating device may be reeled in and the altitude of the UAV may be continued to be increased. At block 560, when the UAV is clear of the UAV docking station, the enclosure system of the UAV docking station may be closed and the UAV may assume a predefined flight path.

Figure 6:
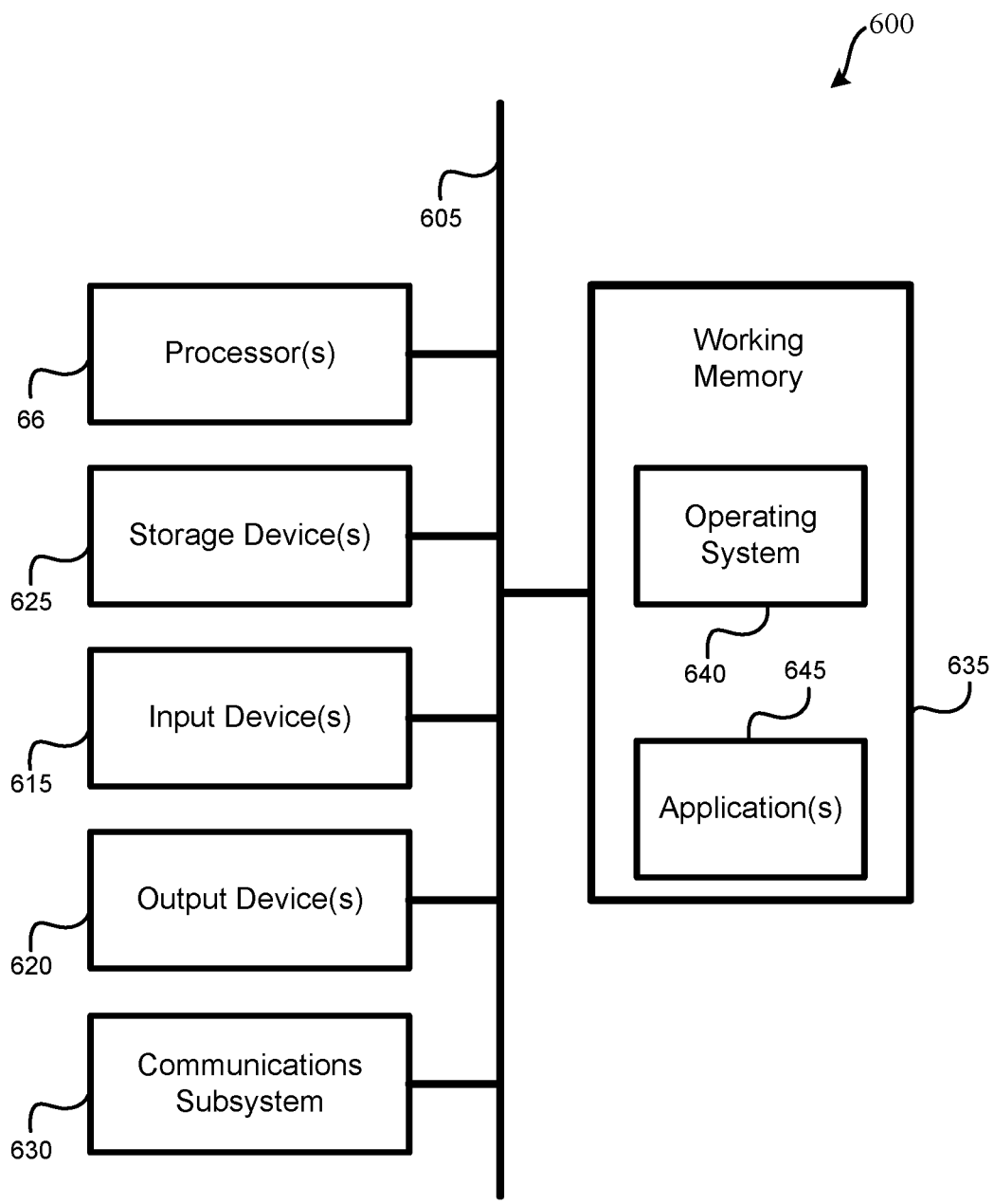
FIG. 6 illustrates an embodiment of a computer system that may be incorporated as part of the UAV and/or UAV docking system.

FIG. 6 illustrates an embodiment of a computer system that may be incorporated as part of the UAV and/or UAV docking system. A computer system as illustrated in FIG. 6 may be incorporated as part of the previously described computerized devices, such as UAV 110, UAV docking station 120, and/or a remote computerized system that controls and/or communicates with UAV 110 and/or UAV docking station 120. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a touchscreen, keyboard, remote control, and/or the like; and one or more output devices 620, which can include without limitation a display device, a printer, etc.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An unmanned aerial vehicle (UAV) docking system, comprising:
   a UAV docking station, comprising: a UAV landing pad; a magnetic coupler; and a recharging system; and
   an on-board UAV docking system incorporated as part of a UAV, the on-board UAV docking system comprising:
      a camera coupled with the UAV such that the camera images a field-of-view below the UAV;

one or more processors that receive one or more images of the field-of-view below the UAV from the camera and locates the UAV landing pad at least partially based on the one or more received images; and a reel and tether system, comprising a tether line, a reel, and a UAV mating device located at an end of the tether line, wherein:

the UAV mating device removably magnetically couples with the magnetic coupler of the UAV docking station; and the one or more processors are configured to, as part of a landing procedure, activate the reel to retract the tether line while the UAV mating device is coupled with the magnetic coupler of the UAV docking station to pull the UAV toward the UAV landing pad while the UAV is hovering.

2. The UAV docking system of claim 1, wherein the tether line, while the magnetic coupler of the UAV docking station is coupled with the UAV mating device, the tether line transfers power to a battery on-board the UAV.

3. The UAV docking system of claim 1, the on-board UAV docking system further comprising a ranging sensor that determines an altitude of the UAV above the UAV landing pad.

4. The UAV docking system of claim 1, wherein the recharging system of the UAV docking station comprises a wireless charger that wirelessly transfers power to the UAV when the UAV is docked with the UAV docking station.

5. The UAV docking system of claim 1, wherein the UAV landing pad comprises multiple visual machine-readable codes that identify different zones of the UAV landing pad, wherein the UAV landing pad accommodates multiple UAVs in the different zones.

6. The UAV docking system of claim 1, wherein the magnetic coupler of the UAV docking station comprises an electromagnet, wherein the electromagnet is powered down during a takeoff procedure of the UAV after the UAV has begun hovering above the UAV landing pad.

7. The UAV docking system of claim 1, wherein the tether line, while the magnetic coupler of the UAV docking station is coupled with the UAV mating device, transfers data to the one or more processors of the UAV.

8. The UAV docking system of claim 1, wherein the UAV comprises a global navigation satellite system (GNSS) module which provides location information to the one or more processors of the UAV, wherein the one or more processors use the location information from the GNSS module to hover the UAV in a general location above the UAV docking station prior to performing the landing procedure.

9. The UAV docking system of claim 1, wherein the UAV docking station further comprises an enclosure system that is controlled by one or more processors of the UAV docking station to open and close as part of the landing procedure and a takeoff procedure.

10. The UAV docking system of claim 1, wherein the tether line and mating device of the reel and tether system of the on-board UAV docking system is located approximately directly beneath a center of gravity of the UAV.

11. The UAV docking system of claim 1, wherein the UAV docking station further comprises a support system that elevates the UAV landing pad at least four feet from the ground.

12. A method for using an unmanned aerial vehicle (UAV) docking system, the method comprising:

hovering, by the UAV, in a hovering position above a docking pad of the UAV docking system based on global navigation satellite system measurements;

capturing, using an on-board camera of the UAV, an image of a machine-readable code present on a surface of the docking pad of the UAV docking system;

adjusting, by one or more processors of the UAV, the hovering position of the UAV above the docking pad based on imaging of the machine-readable code and ranging measurements to the docking pad;

extending, by the one or more processors of the UAV, a tether from the UAV towards the docking pad;

adjusting, by the one or more processors of the UAV, the hovering position of the UAV such a mating device present on a distal end of the tether engages with a coupling device of the UAV docking pad; and reeling, by the one or more processors of the UAV, the tether in to the UAV to assist in lowering the UAV from the hovering position to a landing position on the docking pad.

13. The method for using the UAV docking system of claim 12, further comprising:

charging one or more batteries of the UAV via the tether and mating device engaged with the coupling device of the UAV docking pad.

14. The method for using the UAV docking system of claim 12, wherein engaging the mating device with the coupling device of the UAV docking pad is performed using magnetic attraction.

15. The method for using the UAV docking system of claim 12, further comprising:

opening, by the UAV docking system, one or more enclosure doors to permit access to expose the docking pad and permit the mating device to engage with the coupling device of the UAV docking pad.

16. The method for using the UAV docking system of claim 15, further comprising:

closing, by the UAV docking system, the one or more enclosure doors after the UAV has been determined to have touched down on the docking pad of the UAV docking system.

17. The method for using the UAV docking system of claim 12, further comprising:

determining, by the UAV docking system, that the UAV has touched down onto the docking pad.

18. The method for using the UAV docking system of claim 17, further comprising:

ceasing to power a propulsion system of the UAV in response to determining that the UAV has touched down onto the docking pad.

19. A non-transitory processor-readable medium comprising processor-readable instructions that cause one or more processors of an unmanned aerial vehicle (UAV) to:

cause the UAV to hover in a hovering position above a docking pad of a UAV docking system based on global navigation satellite system measurements;

image, using an on-board camera of the UAV, a machine-readable code present on a surface of the docking pad of the UAV docking system;

adjust the hovering position of the UAV above the docking pad based on imaging of the machine-readable code and ranging measurements to the docking pad;

cause a tether to be extended from the UAV towards the docking pad;

adjust the hovering position of the UAV such a mating device present on a distal end of the tether engages with a coupling device of the UAV docking pad; and cause the tether to be reeled in to the UAV to assist in lowering the UAV from the hovering position to a landing position on the docking pad.

20. The non-transitory processor-readable medium of claim 19, wherein the processor-readable instructions further cause the one or more processors of the UAV to cause a propulsion system of the UAV to cease being powered in response to determining that the UAV has touched down onto the docking pad.

* * * * *